E. R. KERNAN.
Oil Cloth.
No. 14,457.
Patented Mar. 18, 1856.
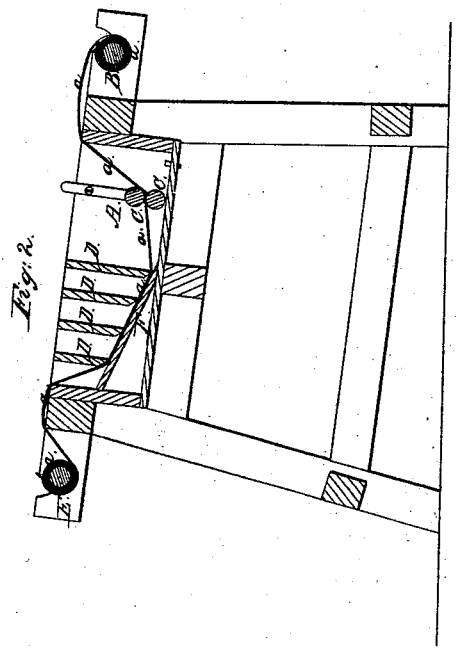
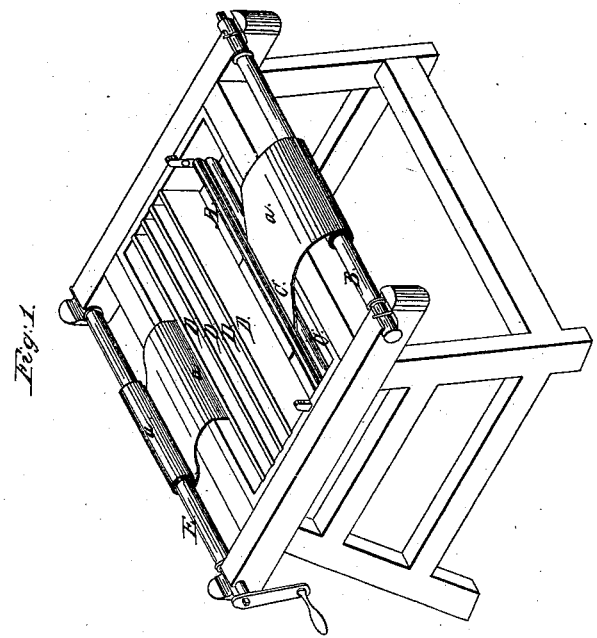

UNITED STATES PATENT OFFICE.

EDW. R. KERNAN, OF PITTSBURGH, PENNSYLVANIA.

PROCESS FOR MAKING TRANSPARENT WINDOW-SHADES.

Specification of Letters Patent No. 14,457, dated March 18, 1856.

*To all whom it may concern:*

Be it known that I, EDWARD R. KERNAN, of Pittsburgh, in the county of Allegheny and State of Pennsylvania, have invented or discovered a new and useful Process in the Manufacture of Translucent Oilcloth for Window-Shades and other Similar Purposes; and I do hereby declare the following to be a full, clear, and exact description of the manner of preparing and manufacturing the same.

The nature of my invention relates to the production of a translucent, and pliable, oil cloth, for window blinds, &c., by a process partly chemical, and partly mechanical, whereby the article is much improved in quality, and materially lessened in price.

To enable others skilled in the art to make and use my invention, I will proceed to describe the compounds used, and the manner of applying them to the material which forms the ground or body of the oil cloth.

The material which forms the ground of the fabric, is usually bleached cotton, or linen cloth. It is first soaked in a mordant composed of starch and alum water, in proportions according to the stiffness required to be given to the article. When removed from the mordant, it is first dried, and then rolled up upon rollers with weight or friction applied to make it even and smooth. When the paint is laid on the cloth by hand, it is taken to a cushion, the surface of which is soft and even, where with a stiff brush is quickly laid onto it, a compound made up of the following ingredients, in the proportions substantially as follows:

Chinese Prussian blue__ 2 ounces.
Chrome green _____ 6 pounds.
Acetate of lead_____ ½ pound.
Balsom of fir_____ 2 ounces.
Copal varnish (No. 1)__ ½ gallon.

The ingredients are ground in boiled linseed oil, and thinned with spirits of turpentine. The material thus far prepared is stretched tightly, and with a long steel knife or spatula, finished or scraped on both its sides, and allowed to dry in a temperature of about 100° Fahr. When thoroughly dried, it is taken down, and rubbed off with pumice stone, and finished with a coat of boiled oil and varnish (Copal) in the proportions of say ⅔ of the oil to ⅓ of the varnish.

By the foregoing process I obtain an article, flexible in its character, translucent, and impervious in a degree to water or moisture, and a better and cheaper article than has been heretofore known in the market. I do not pretent that, I have discovered any new properties in these ingredients, taken separately, but that I have so combined and arranged the order of their use, as to cause the elasticity and transparency of one set of ingredients to so counteract the harshness and opaqueness of the others, as to retain the essential qualities of each, without their injurious ones. I have produced, in quality, an article, not hitherto in the market; and at rates 50 per cent below that of an inferior article. I also produce such shades of color from yellow to green as may be desired, and by a series of processes not hitherto followed, to my knowledge.

In the accompanying drawings, Figure 1 represents a perspective, and Fig. 2, a section through a machine which may be used for saturating the material with paint in which the same mechanical means in an organized form are used, with the same results.

A is the paint box; the material *a* passes from the roll B, through the paint box, and between the rollers *c*, *c*, which press the paint into the cloth. Thence it passes underneath the series of scrapers D, D, D, D, which have sharp edges as seen in Fig. 2, for scraping off the excess of paint, and is wound up on the roll E, and if necessary may be returned again through the machine. The bottom (F, Fig. 2,) against which the scrapers may press by a weight on top of them, or by springs, should be covered with some yielding material, to form a sort of cushion for the cloth to rub upon, as the scrapers are acting upon it. By this contrivance the material is perfectly filled or saturated with paint—the excess being scraped off, and allowed to run back into the paint reservoir A. The rollers C, C, may be made elastic or yielding, so as to yield to the cloth.

Having thus fully described the nature of my invention, what I claim therein as new and desire to secure by Letters Patent is,

The making of flexible or pliable, and semi-transparent oil cloth for window shades and other similar purposes, by a series of processes, such as herein described and set forth.

EDW. R. KERNAN.

Witnesses:
R. BIDDLE ROBERTS,
THOS. STEEL.